Figure 1:
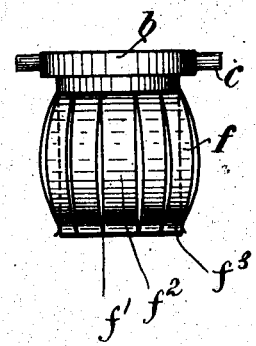

No. 839,004. PATENTED DEC. 18, 1906.
F. KLINGNER.
TOP BEARING FOR VERTICAL SHAFTS.
APPLICATION FILED MAR. 30, 1904.

Witnesses: Friedrich Klingner, Inventor.
By Marion & Marion
Attorneys.

UNITED STATES PATENT OFFICE.

FRIEDRICH KLINGNER, OF FRANKFORT-ON-THE-ODER, GERMANY.

TOP BEARING FOR VERTICAL SHAFTS.

No. 839,004.     Specification of Letters Patent.     Patented Dec. 18, 1906.

Application filed March 30, 1904. Serial No. 200,805.

*To all whom it may concern:*

Be it known that I, FRIEDRICH KLINGNER, director of the Markische Maschinenbauanstalt Teutonia G. M. B. H., residing in the city of Frankfort-on-the-Oder, Empire of Germany, have invented certain new and useful Improvements in Top Bearings for Vertical Shafts; and I do hereby declare that the following is a full, clear, and exact description of the invention, such as will enable others skilled in the art to which it appertains to make and use the same.

My invention relates to bearings for vertical shafts.

The object of my invention is to provide a bearing which will permit the lateral and vertical movement of a shaft.

A further object of my invention is to provide a bearing which will take up the vertical and lateral movement of a shaft; and my invention consists of the construction, combination, and arrangement of parts, as hereinafter illustrated, described, and claimed.

In the accompanying drawings, forming a part of this application, I have illustrated one form of embodiment of my invention, in which drawings similar reference characters designate corresponding parts, and in which—

Figure 2:
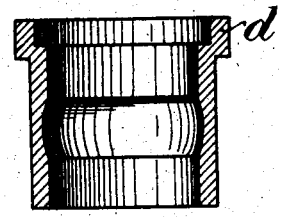
Figure 3:
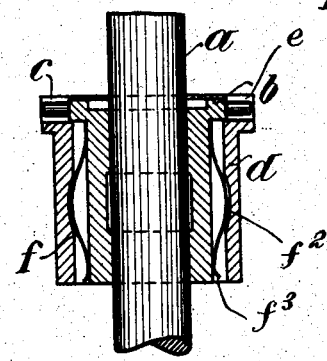
Figure 4:
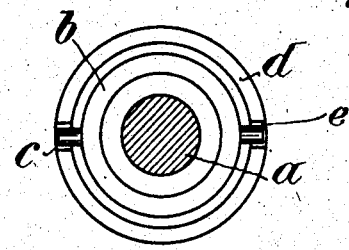

Figure 1 is a side elevation showing a bushing having thereon a resilient sleeve herein described. Fig. 2 is a central vertical section illustrating a box hereinafter described. Fig. 3 is a central vertical section showing the box, the bushing, the resilient sleeve, and in elevation showing the application of a shaft to my invention; and Fig. 4 is a plan view showing the shaft in section.

Referring to the drawings, the shaft $a$ is encircled by a bushing $b$, formed from any suitable metal and provided with laterally-extending lugs $c$. Disposed around the bushing $b$ is a box $d$, of suitable material, provided on its upper edge with vertical slots $e$, adapted to receive the said lugs $c$ when the bushing is inserted in the box. Disposed around the upper part of the bushing $b$ is a sleeve $f$, preferably integral, in which is formed slits $f'$, leaving the lower portion of the sleeve formed with fingers $f^2$, which are bowed outward centrally of their length and the lower portion of each of which is turned outward, as at $f^3$, to permit the ready sliding of the sleeve on the bushing when assembling the parts and when the device is in use.

The inner face of the wall of the box $d$ is provided with a recessed portion $g$, approximately centrally of its length, so that when the parts are in position, as shown in Fig. 3, the bowed portion of the fingers $f^2$ set in the recess. It should be evident from this construction that the sleeve $f$ will be held in operative position by said bowed fingers engaging with the recess.

From the foregoing description and an inspection of the drawings it should be apparent that the construction described will permit the lateral movement of the shaft and also allow a movement of the shaft from a vertical position. Lateral movement is allowed by the bushing moving from side to side, the lugs $c$ working through the slots $e$. When the shaft is displaced from a vertical position, the lugs $c$ serve as pivots, and in either movement the resilient fingers of the sleeve working against the inner face of the wall of the box tend to draw the shaft back into proper position.

Having thus fully described my invention, what I claim as new, and desire to secure by Letters Patent, is—

A top bearing, comprising the combination of a box provided with slots in the upper portion thereof, a bushing disposed in the box and provided with laterally-extending lugs disposed in said slots, and a sleeve disposed on said bushing and provided with a plurality of slits therein leaving a plurality of fingers adapted to bear against the side of the box.

In witness whereof I have hereunto signed my name, this 14th day of March, 1904, in the presence of two subscribing witnesses.

FRIEDRICH KLINGNER.

Witnesses:
    WOLDEMAR HAUPT,
    HENRY HASPER.